United States Patent
Giura et al.

(10) Patent No.: US 10,367,704 B2
(45) Date of Patent: Jul. 30, 2019

(54) ENTERPRISE SERVER BEHAVIOR PROFILING

(71) Applicant: AT&T Intellectual Property I, L.P., Atlanta, GA (US)

(72) Inventors: Paul Giura, Cohoes, NY (US); Stanislav Nurilov, Marlboro, NJ (US); Makonnen Sankore, Grayson, GA (US); Chaim Spielman, Spring Valley, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 213 days.

(21) Appl. No.: 15/207,670

(22) Filed: Jul. 12, 2016

(65) Prior Publication Data
US 2018/0019932 A1    Jan. 18, 2018

(51) Int. Cl.
*H04L 12/26* (2006.01)

(52) U.S. Cl.
CPC ........ *H04L 43/062* (2013.01); *H04L 43/0876* (2013.01); *H04L 43/045* (2013.01)

(58) Field of Classification Search
CPC ................................ H04L 43/06; H04L 43/08
USPC ......................................................... 709/224
See application file for complete search history.

(56) References Cited

U.S. PATENT DOCUMENTS

| | | | |
|---|---|---|---|
| 7,788,198 B2 | 8/2010 | Liu et al. | |
| 8,321,437 B2 | 11/2012 | Lim | |
| 8,713,682 B2 | 4/2014 | Shulman et al. | |
| 8,880,893 B2 | 11/2014 | Moghe et al. | |
| 8,910,238 B2 | 12/2014 | Lukacs et al. | |
| 8,966,625 B1* | 2/2015 | Zuk ....................... | H04L 63/145 709/227 |
| 9,043,587 B1 | 5/2015 | Chen et al. | |
| 9,047,464 B2 | 6/2015 | Sambamurthy et al. | |
| 2009/0048880 A1 | 2/2009 | Shoshan | |
| 2012/0167218 A1 | 6/2012 | Poornachandran et al. | |
| 2015/0074763 A1 | 3/2015 | Schwartz et al. | |
| 2015/0373039 A1 | 12/2015 | Wang | |
| 2015/0373043 A1 | 12/2015 | Wang et al. | |

(Continued)

OTHER PUBLICATIONS

Nakae, et al., "A Behavior-Based Process Confinement Method and Its Application to a Server Security Solution "StarDefence"." NEC journal of advanced technology 2.1 (2005), 10 pages.

*Primary Examiner* — Glenford J Madamba
(74) *Attorney, Agent, or Firm* — Amin, Turocy & Watson, LLP

(57) ABSTRACT

Generation of behavior profiling reports is provided for enterprise server devices in a network of enterprise server devices, as well as generation and association of severity scores for behavior profiling reports generated for enterprise server devices included in the network of enterprise server devices. A method can comprise receiving historical security event data representing historical security events of a first device and owner data representing an owner of the first device, and, as a function of the historical security event data and the owner data, an anomalous contact established between the first device and the second device can be identified. Further, in response to identifying the existence of the anomalous contact, the second device can be depicted on a connected graph of anomalous contacts established by the first device.

20 Claims, 11 Drawing Sheets

(56) References Cited

U.S. PATENT DOCUMENTS

2016/0099971 A1     4/2016   de los Reyes et al.
2018/0069888 A1*   3/2018   Muddu ............... H04L 63/1425

\* cited by examiner

ENTERPRISE SERVER BEHAVIOR PROFILING

TECHNICAL FIELD

The disclosed subject matter relates to the generation of behavior profiling reports for enterprise server devices in a network or collection of enterprise server devices, as well as generation and association of severity scores for behavior profiling reports generated for enterprise server devices included in the collection of enterprise server devices.

BACKGROUND

Enterprise server devices tend to exhibit a steady, consistent behavior with respect to the sets or groups of destination devices that are regularly contacted over defined periods of time. Most enterprise server devices generally communicate with an identifiable or identified small closed domain of devices; attempts by enterprise server devices to communication with devices outside the closed domain of devices would be considered to be an uncommon, infrequent occurrence.

DETAILED DESCRIPTION

Figure 1:
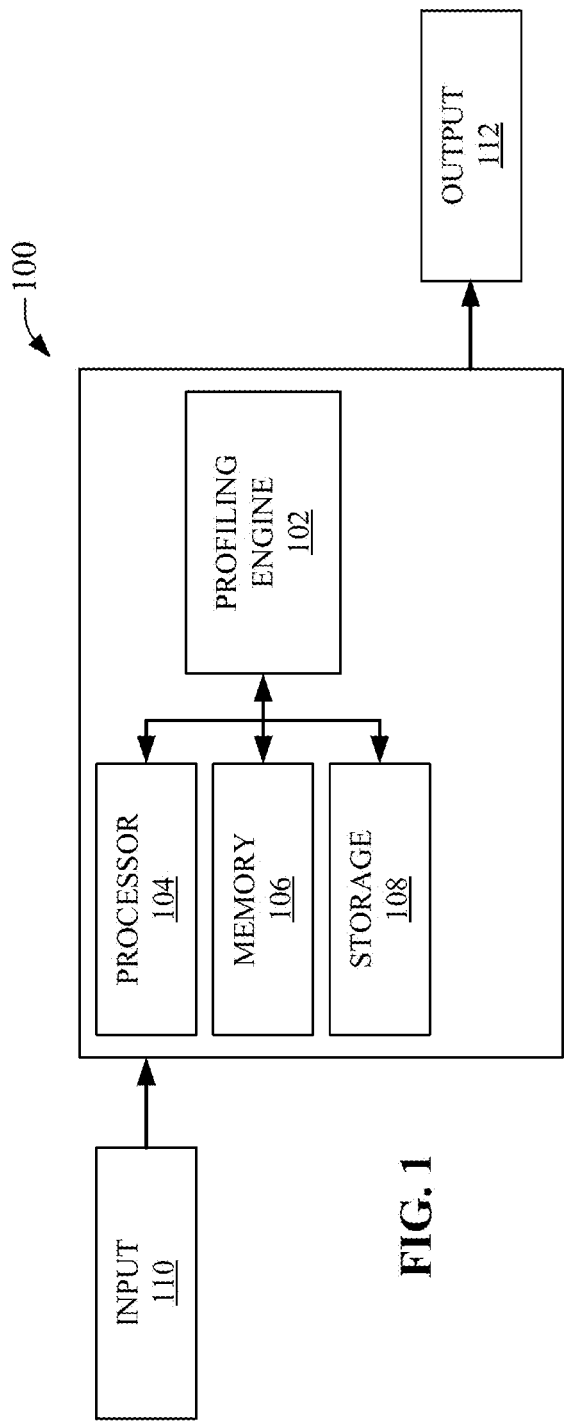
FIG. 1 is an illustration of a system for the generation of behavior profiling reports for enterprise server devices in a network of server devices, as well as for the generation and association of severity scores for each behavior profiling report generated for enterprise server device included network of enterprise server devices, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In many aspects network security intrusion detection can be thought of as being analogous to credit card fraud detection. In general, in the credit card fraud detection scenario, a credit card spending profile can be constructed using the most recent history of legitimate transactions, such that when a transaction falls outside the observed profile, more context can be built around the transaction and a decision made in regard to whether the transaction should be allowed, or whether more information should be collected in order to allow the transaction complete. Similar analogs can be imagined in the context of network transactions; attempted network connections from presumably legitimate devices in a collection or network of devices to other devices in the collection or network of devices. However, despite the foregoing similarity, mostly because of the data processing challenges and the nature of cyber security risk perception, the credit card fraud detection approach has not found broad adoption in mainstream network security systems.

Based on a set of contacted network devices, enterprise network device behavior can be fairly predictable and constant over extended durations of time. For example, on a typical enterprise network device, such as an authentication server, the pattern expected to be followed is a weekly pattern in terms of the number of requests, from roughly the same set of users, with lower traffic expected on weekends. In this scenario, when a new connection is established with a new network device, not seen in the recent defined past (e.g., one week or month) then, this connection can be considered anomalous with respect to the enterprise network device's historically observed profile. As such, additional information would be implicated to evaluate whether the connection conforms to the normal benign profile. In the case of enterprise network server devices, this further information can be obtained from various network sensor devices, such as firewall devices, proxy server devices, intrusion detection system devices, intrusion protection system devices, and the like. Moreover, with advances and capabilities brought on by Big Data processing technologies (e.g., server farms with device capabilities and processor facilities to process data sets so large and/or complex that traditional data processing devices and processes are inadequate and/or incapable of providing such processing), the task of processing these heterogeneous and varied sensor logs has become viable, even for larger organizations. The richness of such varied network logs collected, allows for assessment of suspicious new connections made to and by enterprise server devices and to react better in cases where real and actual security breaches occur.

The subject disclosure describes and provides systems and methods for generation of behavior profiling reports for networked server devices (such as enterprise server devices) that can comprise a collection or network of networked server devices (e.g., other enterprise server devices). Additionally, description and disclosure is provided for systems and methods for generating and associating severity scores for each generated behavior profiling report generated for respective networked server devices.

The disclosed systems and methods, in accordance with an embodiment, provide a system, apparatus, or device comprising: a processor, and a memory that stores executable instructions that, when executed by the processor, facilitate performance of operations. The operations can comprise receiving historical security event data representing historical security events of a first device and owner data representing an owner of the first device; as a function of the historical security event data and the owner data, identifying an existence of an anomalous contact established between the first device and the second device; and in response to identifying the existence of the anomalous contact, depicting the second device on a connected graph of anomalous contacts established by the first device. Additional operations can include determining the existence of the anomalous contact as a function of the first device being determined to have failed to establish a contact with the second device within a defined period of time; connecting the first device and the second device as depicted on the connected graph of the anomalous contacts with an edge representing a connection between the first device and the second device; and using a white list devices that are accorded a defined privilege, a defined service, a defined mobility, a defined access, or a defined recognition.

In regard to the foregoing the first device and the second device can be part of a geographically distributed network of devices; the owner data can have been received from a database device maintained and/or populated by a regional Internet registry; the anomalous contact can be a communication by the first device to the second device within a defined period of time; the anomalous contact is a communication by the second device to the first device within a defined period of time; and the historical security event data and the owner data can have been correlated or interrelated with one another as a function of an internet protocol (IP) address included in the received historical security event data.

In accordance with a further embodiment, the subject disclosure describes a method, comprising a series of acts that can include: as a function of historical security event data and owner data, determining, by a system comprising a processor, an existence of an anomalous contact established between a first device and a second device; and in response to identifying the existence of the anomalous contact, depicting, by the system, the second device on a connected graph of anomalous contacts established by the first device. Additional acts can include receiving, by the system, the historical security event data representing the historical security events of the first device and the owner data representing an owner of the first device; determining, by the system, the existence of the anomalous contact as a function of the first device being determined to have failed to establish a contact with the second device within a defined period of time; connecting, by the system, the first device and the second device as depicted on the connected graph of the anomalous contacts with an edge representing a connection between the first device and the second device; and using, by the system, a list of devices that are accorded a defined privilege, a defined service, a defined mobility, a defined access, or a defined recognition.

In connection with the foregoing, the first device and the second device can form part of a geographically distributed network of devices; the owner data can have been received from a database device maintained and/or populated by the first device; the anomalous contact can have been a communication by the first device to the second device within a defined time period; and the anomalous contact can have been a communication by the second device to the first device within a defined period of time.

In accordance with a still further embodiment, the subject disclosure describes a machine readable storage medium, a computer readable storage device, or non-tangible machine readable media comprising instructions that, in response to execution, cause a computing system comprising at least one processor to perform operations. The operations can include: receiving security event data representing security events associated with a first device and owner data representing an owner of the first device; as a function of the security event data and the owner data, determining and existence of an anomalous contact established between the first device and the second device; in response to determining the existence of the anomalous contact, depicting the second device on a graph of anomalous contacts established by the first device; and determining the existence of the anomalous contact as a function of the first device being determined to have failed to establish a contact with the second device within a defined time period.

As has been noted above, internal enterprise network server devices tend to exhibit a steady state behavior with respect to sets of destination devices that it regularly contacts over defined periods of time. Since most enterprise server devices work in a closed domain, there typically are rare instances when an enterprise server device needs to attempt any new connections to the broader Internet. In most cases where new connections to the broader Internet are necessary, the Internet destinations generally represent known trustable enterprises, or business partners that can be, or can have been, included in a trusted white list document/file. Thus, under normal circumstances, server device behavior generally comprises mostly connections to other internal systems that it has been in communication within a defined recent past (e.g., previous day, previous three days, previous five days, previous week, previous fortnight, previous month, previous three months, previous, six months, previous year, etc.), or connections to trusted entities included in a white list. Should an enterprise server device attempt to connect to a new unknown destination outside its previously defined profile, this can be an indication, for instance, of a server breach, data exfiltration (e.g., surreptitious extraction of data), or Command and Control communication, at which point additional intelligence should be gathered, collected, and collated about the new unknown destination Internet Protocol (IP) address(es); if the unknown destination is associated with internal enterprise IP address(es); and information from historical network server log files, information that can include details for instance, new ports open, and baseline statistics for other meaningful features such as observation of unaccounted for increases of bytes communicated, new firewall messages, new signatures detected, and the like that can have been communicated through the newly opened ports. This intelligence can then be used to generate a behavior profiling report automatically for each server device along with severity scores for each generated behavior profiling report, which can facilitate analysis to determine the nature of the security incident, and the priority of subsequent forensic investigations.

In order to generate the behavior profiling report and the associated severity scores for the generated behavior profiling report, historical security event data and IP owner information for each of the servers, or entity devices of interest, are processed to generate ranked reports wherein deviations from a historical norm for each of the servers is determined. When deviations from the historical profile for each of the servers occur, and in response to, as a function of, or based at least in part on the detected/determined deviations from the historical profiles, an overall connected graph structure with all server devices monitored and new destinations they contact outside their observed historical profile can be generated, wherein the graph structure comprises all the servers with observed deviations from the historical profile, the servers and new destinations are represented as nodes within the graph structure, and connections between the servers and the new destinations represent edges in the graph structure. The global graph view provided by the graph structure can enable security analysts to quickly single out and identify problematic internal servers and assess the overall security situation.

A deviation can typically be considered to be a single new destination contacted by a server device, when that destination has not been contacted or communicated with within a defined period of time (e.g., two days, five days, one week, a fortnight, thirty days, a quarter period (i.e., three months), six months, etc.). This deviation measure or threshold can be a parameter that can be tuned to a certain value depending on organizational specifics and security policy. Each generated behavior profiling report, as noted above can thereafter be associated with, and accompanied by, a generated severity score (e.g., a weighted sum value, weighted average value, . . . , of the detected anomalies) that can indicate the importance of the behavior profiling report in regard to future forensic investigations and/or the severity of the detected anomalous incident(s).

Now with reference to the Figures, FIG. 1 illustrates a system 100 that in accordance with various embodiments provides for the generation of behavior profiling reports for devices (e.g., enterprise server devices) in a wired and/or wireless network or wired and/or wireless collection of devices (e.g., other devices, some of which can be server devices), as well as for the generation and association of severity scores for each generated behavior profiling report for each device included the networked collection of devices. System 100, for purposes of exposition, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

As illustrated, system 100 can include or comprise profiling engine 102 that can be coupled to a processor 104, memory 106, and storage 108. Profiling engine 102 can be in communication with processor 104 for facilitating operation of computer or machine executable instructions and/or components by profiling engine 102, memory 106, for storing data and/or the computer or machine executable instructions and/or components, and storage 108 for providing longer term storage of data and/or machine and/or computer executable instructions. Additionally, system 100 can also receive input 110 for use, manipulation, and/or transformation by profiling engine 102 to produce one or more useful, concrete, and tangible result and/or transform one or more articles to different states or things. Further, system 100 can also generate and output the useful, concrete, and tangible result and/or the transformed one or more articles produced by profiling engine 102 and output as output 112.

In order to generate behavior profiling reports for respective devices that can comprise a wired and/or wireless network, as well as for the generation and association of severity scores for each respective generated behavior profiling report for each device included the networked collection of devices, profiling engine 102, in conjunction with processor 104 can receive historical security event data representing historical security events associated with a contacting device (e.g., a first device) as well as the owner data representing details in regard to an owner of the contacting device (the first device). Typically, the historical security event data can be drawn from one or more database of database devices that store one or more sensor log file from a plethora of varied network sensor devices, such as, firewall devices, proxy server devices, intrusion detection system devices, intrusion protection system devices, etc. In accordance with an embodiment, the historical security event data can be maintained and retrieved from storage 108. In an additional and/or alternative embodiment, the historical security event data can be maintained/populated and obtained from one or more external database of database devices associated with firewall devices, proxy server devices, intrusion detection system devices, and intrusion protection system devices, for example.

Owner data can, in accordance with an embodiment, generally be obtained from one or more database of a networked collection of database devices typically maintained and/or populated by regional Internet registries (RIRs). Additionally and/or alternatively, owner data can be obtained from databases persisted to storage 108, where system 100 at least mirrors or stores such owner data. Owner data can comprise records that provide details such as domain information (e.g., .org, .com, .edu, .biz, . . . ), organization name, organization mailing address, contact information (e.g., email addresses, phone numbers, fax numbers, . . . ), a record regarding the date the record was created, and if, and when, the owner record was changed, the date that the change was effectuated and/or became effective.

Profiling engine 102 can thereafter, in response to, based on, or as a function of at least the historical security event data and/or the owner data (e.g., historical security event data supplemented, augmented, correlated, interrelated, or interlinked with owner data) determine or identify the existence of an anomalous contact established between the contacting device (the first device) and a contacted device (e.g., a second device). Other information that profiling engine 102 can utilize to identify anomalous contacting devices can include white lists—lists of devices that are accorded a defined privilege, defined service, defined mobility, defined access, or defined recognition; devices included in white lists of generally accepted, approved, and/or recognized devices are those that are recognized by the organization/enterprise as being trustworthy and, until proven otherwise, beyond reproach. Further information that profiling engine 102 can employ to determine anomalous contacting devices can also include server lists that can have been generated to include (internal and/or external) server devices that are typically in communication with one another, and that have been accorded an ultimate or highest trustworthy status.

Profiling engine 102 in response to, as a function of, or based on identifying the existence of an anomalous contact can generate, create, or update a connected graph of anomalous contacts, wherein the contacting device (e.g., the first device), determined/identified as being anomalous, can be represented as a first node in the connected graph, and the device to which the contacting device (first device) attempted contact (e.g., the second device) can be represented as a second node in the connected graph. Profiling engine 102 can use a graph edge to connect the first node to the second node, wherein the graph edge is representative of the fact that the first device (the contacting device) attempted to contact the second device (the contacted device). Other details, if required, such as IP address, information regarding ownership (e.g., domain information, organization name, organization mailing address, contact information, . . . ) of the respective first device and second device can also be included in the connected graph, in particular and with respect to, and in association with, the respective graph nodes representing the first device and second device.

Profiling engine 102, in addition to the foregoing, can also, on receiving network traffic data (e.g., log files from varied network devices, such as, authentication devices, firewall devices, proxy server devices, intrusion detection system devices, intrusion protection system devices, . . . ), can augment or correlate the network traffic data with records that provide details such as domain information, organization name, organization mailing address, contact information, records regarding dates the record was created, and if the record was changed/updated the date that the change was effectuated and/or became effective for each device included in the network traffic data.

Once profiling engine 102 has augmented and/or correlated the network traffic data with additional detail regarding ownership information for each device identified in the received or obtained network traffic data, profiling engine 102, for each identified device can employ a defined or definable moving window (see FIG. 5) to collect, identify, or determine behavior features such as new destination IP addresses, owners, ports used, actions performed, messages (and bytes) received and/or transmitted, etc. occurring within the defined or definable moving window (e.g., wherein the moving window captures events that have occurred during the previous N days, where N is an integer greater than 0) to generate a historical behavior profile for each respective device included in the network traffic data.

Thereafter, in response to, based or, and/or as a function of the historical behavior profile generated for each respective device, profiling engine 102 determines whether or not there are new unknown destination IP addresses that appear in relation of network traffic data received or obtained for the current day (e.g., the new day); profiling engine 102 compares data included in the generated historical behavior profile for a device at issue with data included in network traffic data representative of the current day for the same device at issue. Profiling engine 102, when it identifies new unknown destination IP addresses that did not appear in the historical behavior profile report for a particular device but that appear in the network traffic data obtained for the device for the current day, can determine whether the number of new unknown destination IP addresses exceeds a defined set point or threshold value, whereupon in response to, as a function of, or based on the quantum of new unknown destination IP addresses having exceeded the defined set point or threshold value, profiling engine 102 can generate a report that is supplemented with at least the identified new unknown destination IP addresses.

In view of the foregoing, it is contemplated that the functionalities and facilities provided by system 100, and in particular profiling engine 102, can be beneficially utilized by devices, such as domain control devices, that manage authentication and authorization across enterprise applications and services, as well as devices that perform or provide services and functionalities that are of a subordinate nature to those provided domain controller devices.

Figure 2:
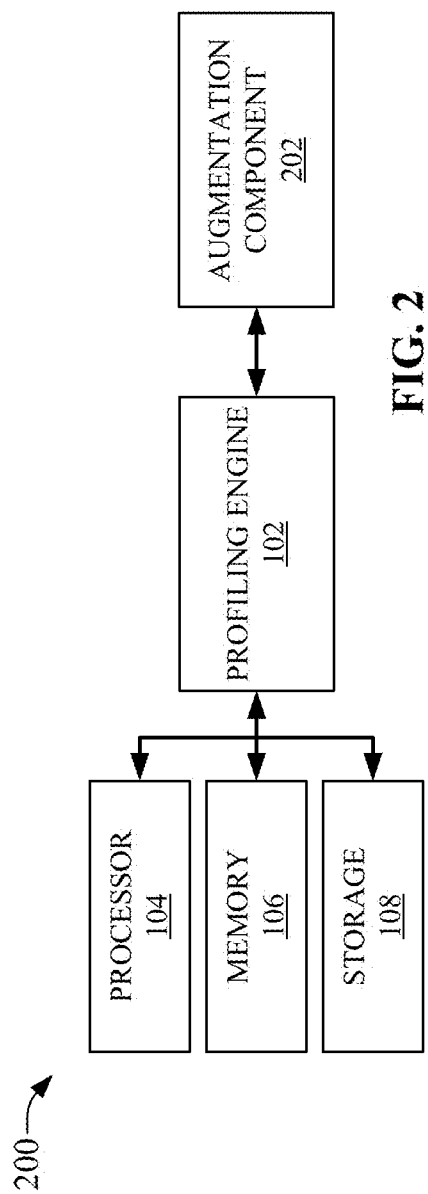
FIG. 2 is a further depiction of a further system for the generation of behavior profiling reports for enterprise server devices in a network of server devices, as well as for the generation and association of severity scores for each behavior profiling report generated for enterprise server device included network of enterprise server devices, in accordance with aspects of the subject disclosure.

In reference to FIG. 2, an additional depiction of system 100 is illustrated as system 200. System 200, in accordance with various embodiments, provides for the generation of behavior profiling reports for devices in a wired and/or wireless collection of devices, as well as for the generation and association of severity scores for each generated behavior profiling report for each device included the networked collection of devices. As illustrated, system 200 can include augmentation component 202 that can utilize the functionalities and facilities provided by profiling engine 102, processor 104, memory 106, and storage 108 to correlate network traffic data records received or obtained from one or more of various network sensor devices, such as firewall devices, proxy server devices, intrusion detection system devices, intrusion protection system devices, and the like, with retrieved records that provide details regarding each device included in the network traffic records, such as domain information, organization name, organization mailing address, contact information, records regarding the date the record was created, and if, and when, the owner record was changed, the date that the change was effectuated and/or became effective.

Figure 8:
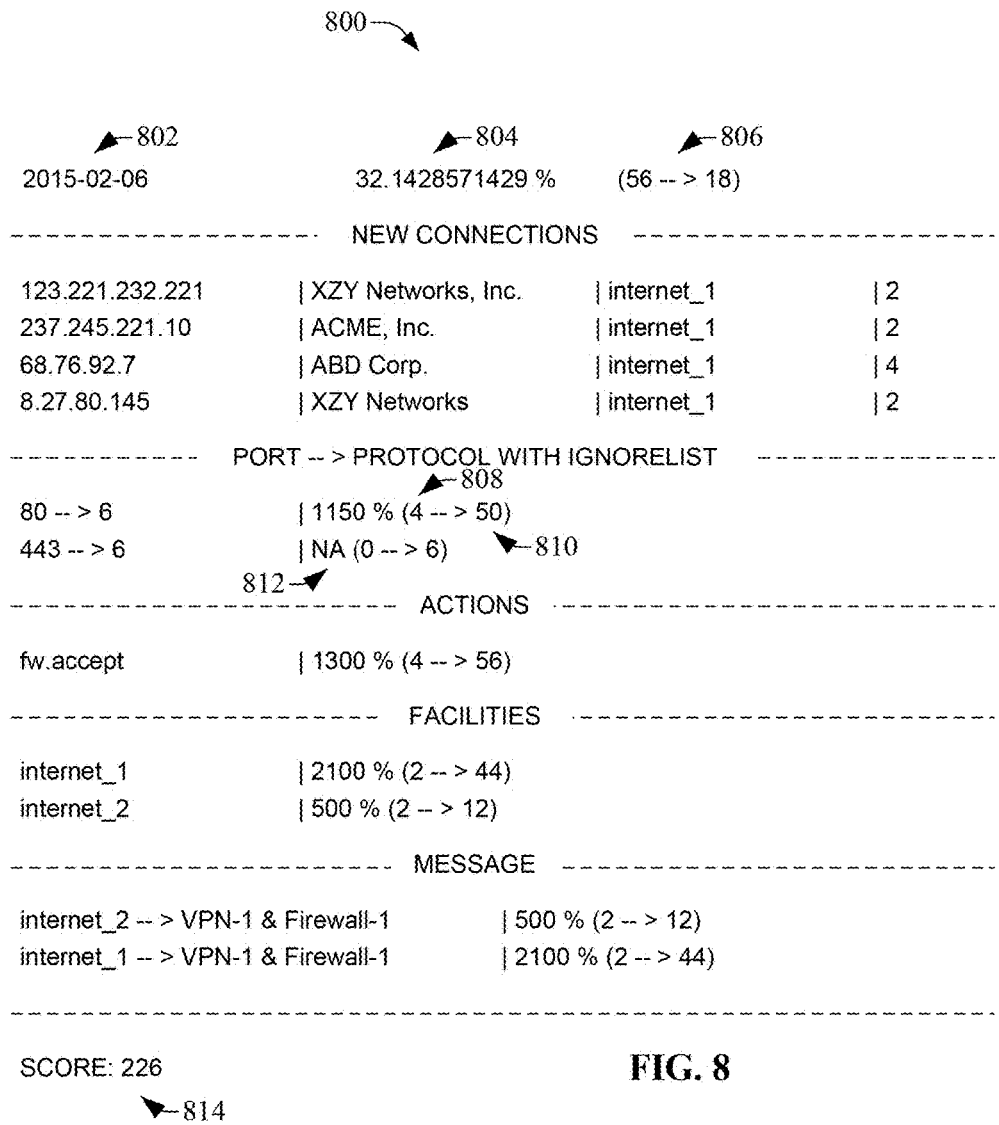
FIG. 8 provides illustration of an example forensic report that can be generated by the disclosed system, in accordance with aspects of the subject disclosure.
Figure 9:
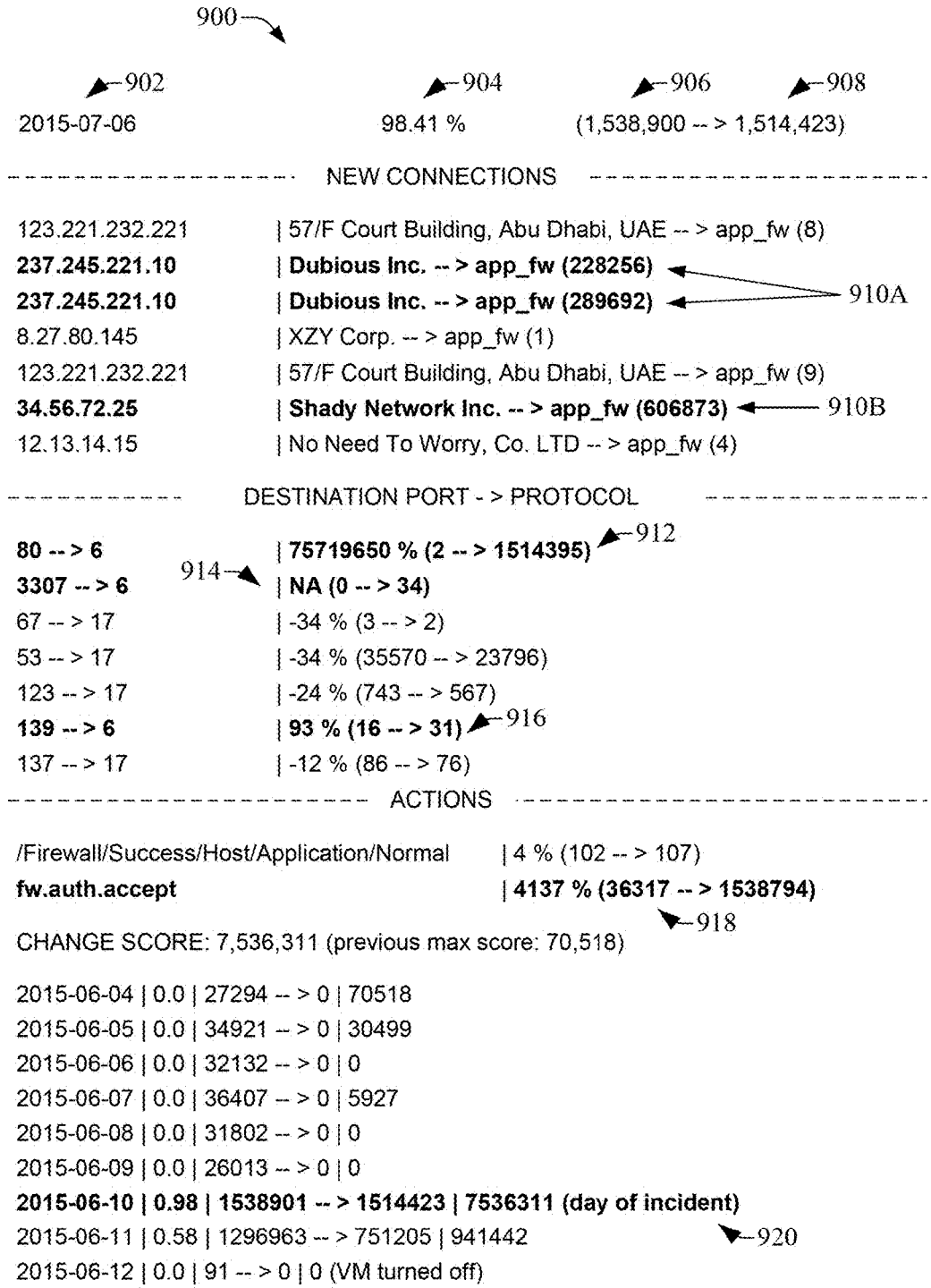
FIG. 9 provides illustration of a further example report that can be generated by the disclosed system, in accordance with aspects of the subject disclosure.

In accordance with an aspect, augmentation component 202 can perform the mapping or correlation between received or obtained network traffic data records and the obtained or retrieved records providing details of each device included in the network traffic data records as a function of, based on, or in response to an IP address that can have been included in the obtained or retrieved network traffic data records. Examples of such correlations or mappings are provided in FIGS. 8-9 under the "NEW CONNECTIONS" heading, wherein, as illustrated in FIG. 8, IP addresses have been mapped to the names of the organizations that have been assigned the IP addresses, and as depicted in FIG. 9, IP addresses have been interrelated with physical mailing addresses and/or corporate names of the organizations that were assigned the IP addresses.

Figure 3:
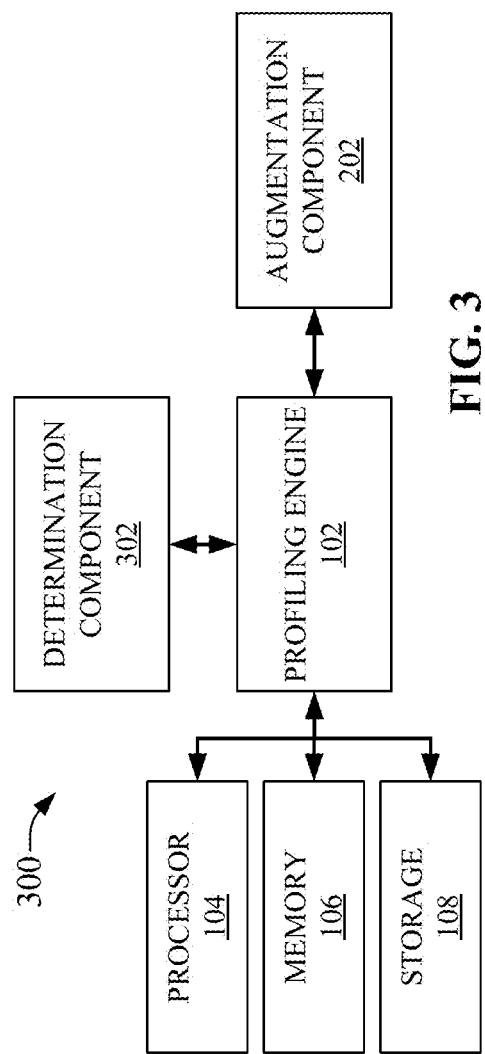
FIG. 3 provides illustration of an additional system for the generation of behavior profiling reports for enterprise server devices in a network of server devices, as well as for the generation and association of severity scores for each behavior profiling report generated for enterprise server device included network of enterprise server devices, in accordance with aspects of the subject disclosure.

FIG. 3 is a further illustration of system 100 is depicted as system 300. System 300 in accordance with disclosed and described embodiments provides for the generation of behavior profiling reports for devices in a wired and/or wireless collection of devices, as well as for the generation and association of severity scores for each generated behavior profiling report for each device included the networked collection of devices. As depicted, system 300 can include determination component 302, that in collaboration with augmentation component 202, profiling engine 102, processor 104, memory 106, and storage 108, and in response to, based on, or as a function of at least historical security event data and/or owner data, determine or identify the existence of an anomalous contact established between the contacting device (the first device) and a contacted device (e.g., a second device). Other information that determination component 302 can utilize to identify anomalous contacting devices can include lists of devices that are accorded a defined privilege, defined service, defined mobility, defined access, or defined recognition (e.g., white lists); devices included in such lists are generally accepted, approved, and/or recognized devices by the commercial organization/enterprise as being trustworthy and, until proven otherwise, beyond reproach. Determination component 302 can also use server lists to determine anomalous contacting devices. Such server lists can have been generated to include (internal and/or external) server devices that historically have been in operative communication with one another, and that have been accorded an ultimate or highest trustworthy status.

Determination component 302 can for each identified device can employ a defined or definable moving window to collect, identify, or determine behavior features such as new destination IP addresses, owners, ports used, actions performed, messages (and bytes) received and/or transmitted, etc. occurring within the defined or definable moving window to generate a historical behavior profile for each respective device included in the network traffic data. Thereafter, as a function of, based on, or in response to the historical behavior profile generated for each respective device, determination component 302 determines whether or not there are new unknown destination IP addresses that appear in relation of network traffic data received or obtained for the current day (e.g., the new day). In accordance with this aspect, determination component 302 compares data included in the generated historical behavior profile for a device at issue with data included in network traffic data representative of the current day for the same device at issue. Determination component 302, when it identifies new unknown destination IP addresses that did not appear in the historical behavior profile report for a particular device, but that appear in the network traffic data obtained for the device for the current day, can determine whether the number of new unknown destination IP addresses exceeds a defined set point or threshold value, whereupon in response to, based on, or as a function of the quantum of identified new unknown destination IP addresses having exceeded the defined set point or threshold value, determination component 302 can generate a new day report that is a report that is supplemented with at least the identified new unknown destination IP addresses.

Figure 4:
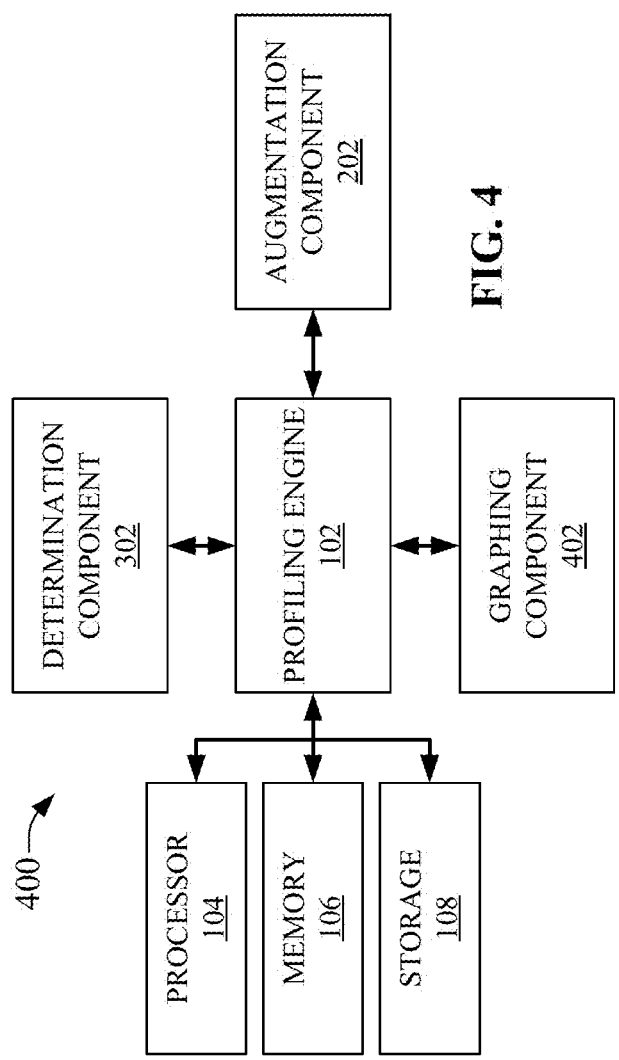
FIG. 4 provides another illustration of a system for the generation of behavior profiling reports for enterprise server devices in a network of server devices, as well as for the generation and association of severity scores for each behavior profiling report generated for enterprise server device included network of enterprise server devices, in accordance with aspects of the subject disclosure.

FIG. 4 is an additional depiction of system 100, now depicted as system 400. System 400, in accordance with one or more various embodiments, provides for the generation of behavior profiling reports for devices in a wired and/or wireless networked collection of devices, as well as for the generation and association of severity scores for each generated behavior profiling report for each device included in the networked collection of devices. As depicted, system 400 can include graphing component 402 that in collaboration with one or more inputs received from, and/or outputs directed to, determination component 302, augmentation component 202, and profiling component 102, and processor 104, memory 106, and storage 108, can, as a function of, based on, or in response to identifying or determining the existence of an anomalous contact by, for example, determination component 302, can generate, create, and/or update a connected graph nodes representing anomalous contacts, wherein the contacting device (e.g., the first device), determined/identified as being anomalous by determination component 302, can be represented as a first node in the connected graph, and the device to which the contacting device (first device) attempted contact (e.g., the second device) can be represented as a second node in the connected graph. Graphing component 402 can then apply a graph edge to connect the first node to the second node. The graph edge that connects the first graph node to the second graph node can be representative of the fact that the first device (the contacting device) attempted to contact the second device (the contacted device) within a defined or definable duration/period of time. Other details, if required, such as IP addresses, information regarding ownership (e.g., domain information, organization name, organization mailing address, contact information, . . . ) of the respective first device and second device can also be included to appropriately annotate the connected graph, in particular with respect to, and in association with, the respective graph nodes representing the first device and second device.

Figure 5:
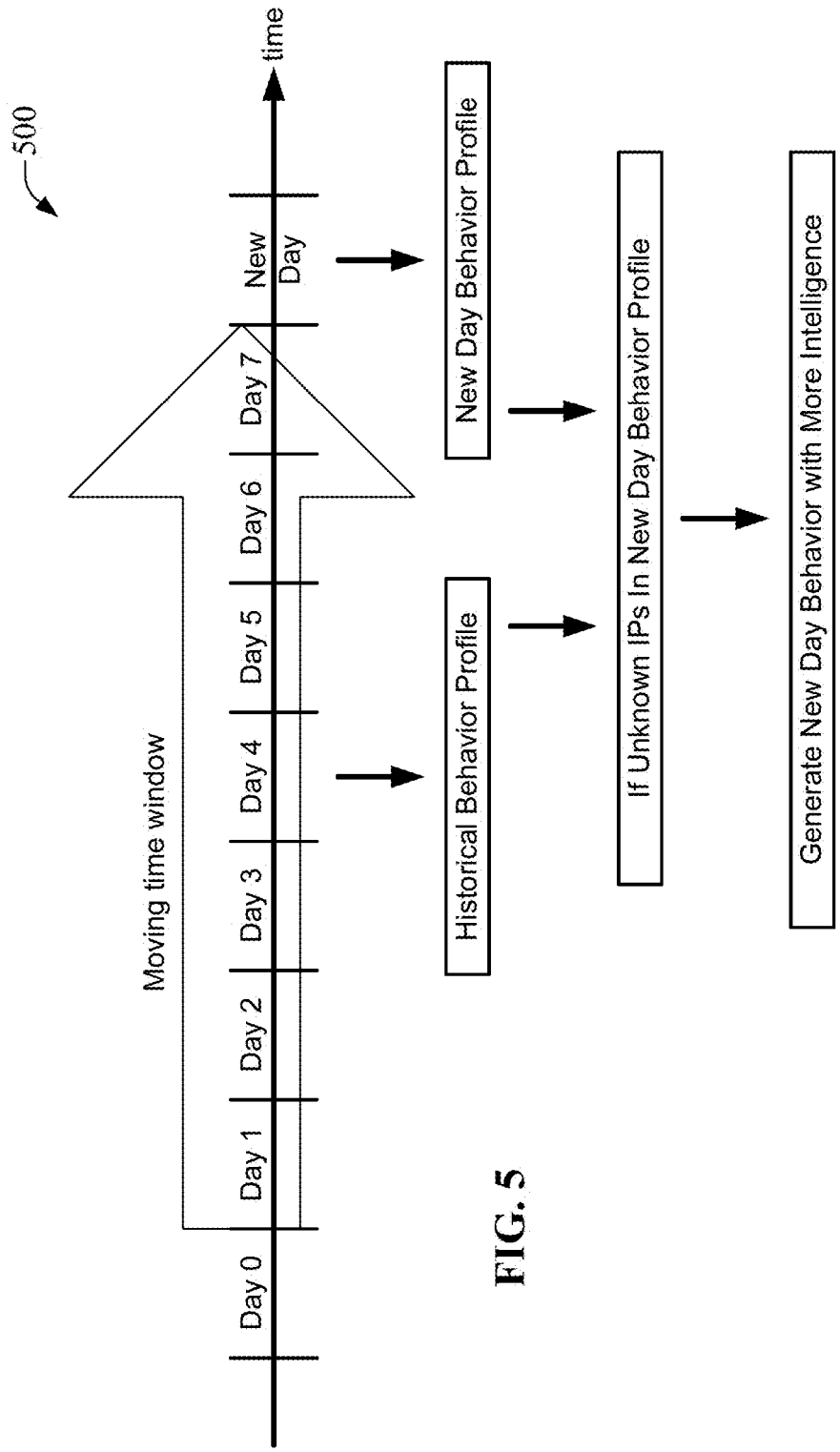
FIG. 5 illustrates another depiction of a moving time window for the generation of behavior profiling reports for enterprise server devices in a network of server devices, as well as for the generation and association of severity scores for each behavior profiling report generated for enterprise server device included network of enterprise server devices, in accordance with aspects of the subject disclosure.

Turning now to FIG. 5 that illustrates an example moving time window that can be used to generate behavior profiles for devices in a networked collection of devices. The moving time window, for each identified device, can be used to collect, identify, or determine behavior features such as new destination IP addresses, owners, ports used, actions performed, messages (and bytes) received and/or transmitted, etc. occurring within the defined or definable moving window. The moving window captures historical events that have occurred during a previous N days, where N is an integer greater than 0. The historical behavior features that occur within the moving window are used to generate a historical behavior profile for each respective device included in the network traffic data. Thereafter, in response to, as a function of, or based on the historical behavior profile generated for each respective device, a determination is made as to whether or not there are new unknown destination IP addresses that appear in relation to current network traffic data received or obtained for the current day and included in a new day behavior profile. The determination in regard to whether or not new unknown destination IP address appear in relation to network data for the current day can be based on a comparison of data included in the generated historical behavior profile for a device at issue with respect to data included in network traffic data representative of the current day for the same device at issue (e.g., the new day behavior profile).

In regard to determining whether or not there are new unknown destination IP addresses that appear in relation to current network traffic data received or obtained for the current day and included in the new day behavior profile, it will be appreciated by those of ordinary skill that the interval during which particular behavior is observed can be measured in partial seconds, seconds, minutes, hours, and the like, depending on a granularity based on how fast one wishes to detect anomalies for monitored servers. For example, when one wishes to detect behavior changes every hour, the extent of the moving time window can comprise behavior features that occur within an hour timeframe, in which case a comparison can be made with regard to historical behavior features that occurred in the preceding hour(s).

Based on, as a function of, or in response to determining or identifying an unknown destination IP addresses that did not appear in the historical behavior profile report for a particular device, but that appears in the new day behavior profile, a determination can be made in regard to whether the number of new unknown destination IP addresses exceeds a defined set point or threshold value. Where the number of unknown destination IP addresses exceeds the defined set point or threshold value, a further report that includes at least the identified unknown destination IP addresses is generated as a new day behavior report supplemented with more intelligence.

Figure 6:
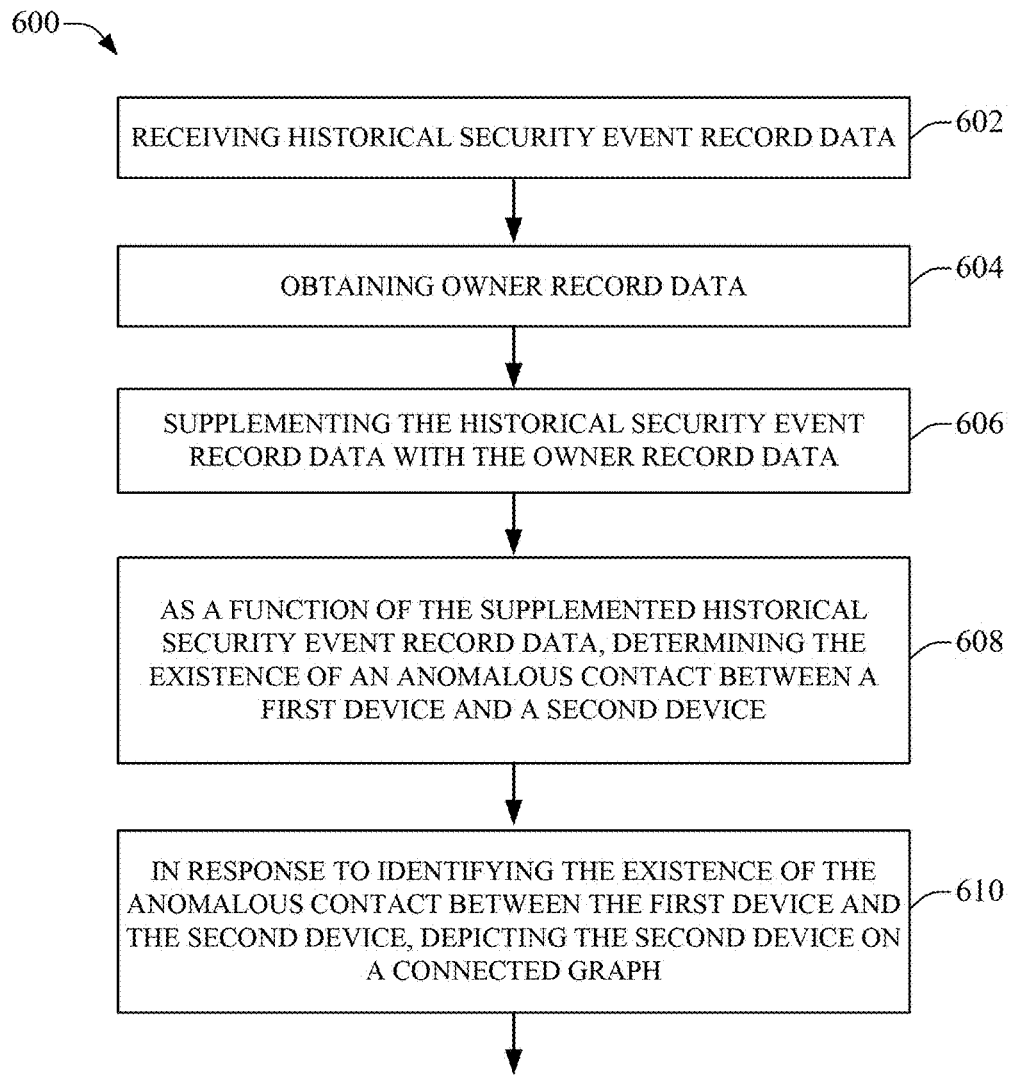
FIG. 6 provides illustration of a flow chart or method for the generation of behavior profiling reports for enterprise server devices in a network of server devices, as well as for the generation and association of severity scores for each behavior profiling report generated for enterprise server device included network of enterprise server devices, in accordance with aspects of the subject disclosure.
Figure 7:
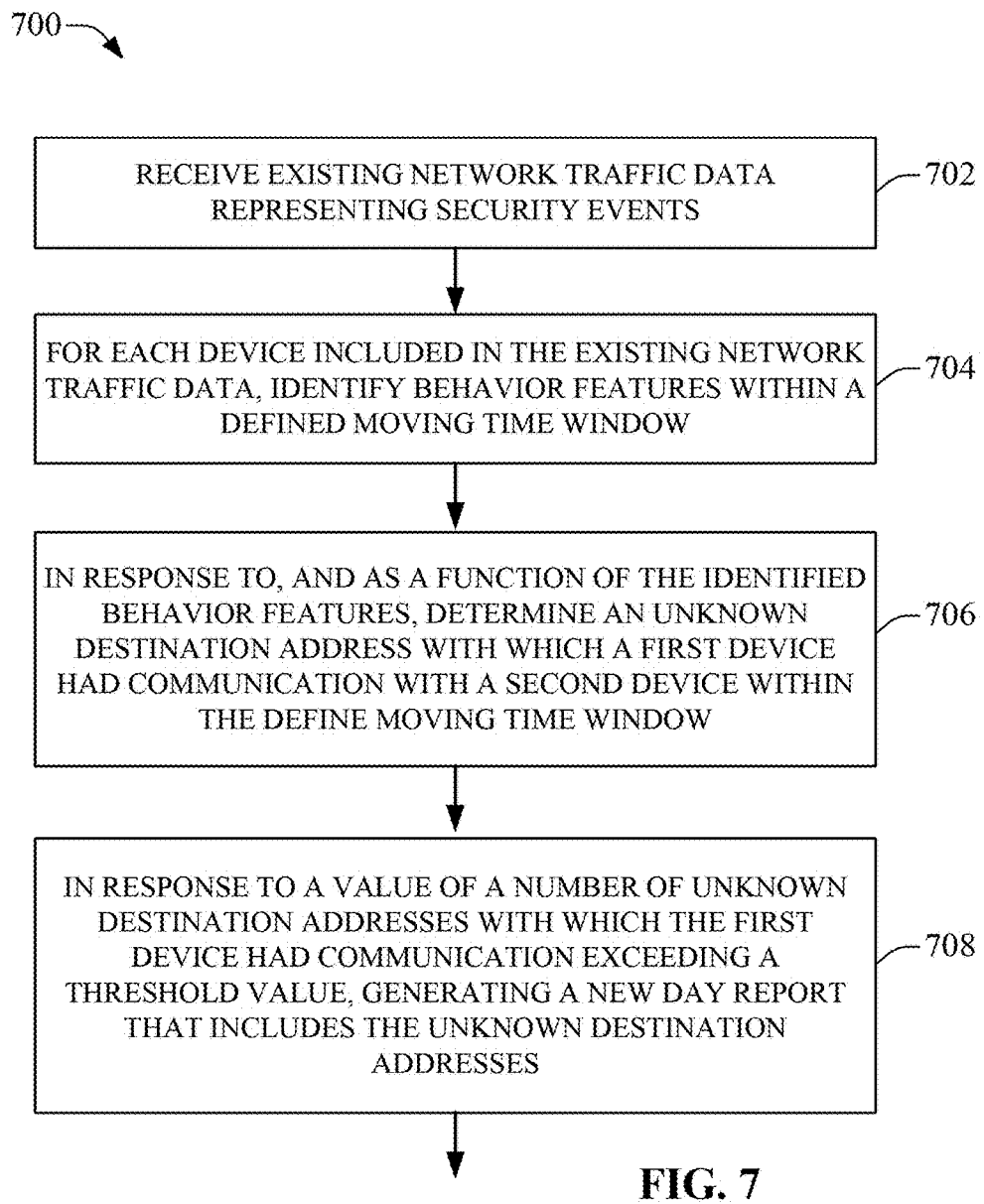
FIG. 7 provides illustration of another flow chart or method for the generation of behavior profiling reports for enterprise server devices in a network of server devices, as well as for the generation and association of severity scores for each behavior profiling report generated for enterprise server device included network of enterprise server devices, in accordance with aspects of the subject disclosure.

In view of the example system(s) described above, example method(s) that can be implemented in accordance with the disclosed subject matter can be better appreciated with reference to flowchart in FIGS. 6-7. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 for the generation of behavior profiling reports for each device that is included in a wired and/or wireless network or wired and/or wireless collection of devices, as well as for the generation and association of severity scores to each generated behavior profiling report for each respective device included the networked collection of devices. As depicted, method 600 can be performed by system 100, and in particular profiling engine 102, and can commence at 602, where historical security event record data can be received as input 110. For example, historical security event record data can be received from one or more of a plethora of varied and/or disparate network sensor devices, such as, firewall devices, proxy server devices, intrusion detection system devices, intrusion protection system devices, authentication devices, and the like, and in the form, for example, of logs files received from one or more of the disparate and diverse network sensor devices.

In response to, as a function of, or based on receiving historical security event record data, system 100, and more specifically profiling engine 102 can, at 604, also receive and/or obtain, as input 110, owner data that can be received/obtained from one or more database of a networked collection of database devices that can be maintained and/or populated by, for instance, regional Internet registries (RIRs). Owner data can additionally and or/alternatively be received or obtained from one or more databases persisted to storage 108, wherein system 100 at least mirrors, maintains, and stores such owner data. As has been noted earlier, owner data can comprise records that provide details such as domain information (e.g. .org, .com, .edu, .biz, . . . ), organization name, organization mailing address, contact information (e.g., email addresses, phone numbers, fax numbers, . . . ), a entry regarding the date the owner record was created, and if, and when, the owner record was changed, the date that the change was effectuated and/or became effective.

At 606, the historical security event record data can be augmented, correlated, interrelated, interlinked, or supplemented with the owner data. At 608, as a function of, based on, or in response to the supplemented historical security event record data, system 100 (and in particular profiling engine 102) can determine whether there exists any anomalous contacts between a first device and a second device. At 608, system 100 (e.g., profiling engine 102), in response to, based on, or as a function of identifying or determining the existence of an anomalous contact between the first device and second device, can depict the second device in a connected graph, wherein the connected graph is a graph of anomalous contacts that depicts the contacting device determined/identified as having been anomalous as a first node in the connected graph, and the device to which the first device attempted contact, the second device can be represented as a second node in the connected graph. Additionally and/or alternatively at 608 system 100 and profiling engine 102 can use graph edge to connect the first node to the second node, wherein the graph edge can represent the fact that the first device (the contacting device) attempted to contact the second device (the contacted device). Also at 608, other details, if necessary, such as IP address, information regarding ownership (e.g., domain information, organization name, organization mailing address, contact information, . . . ) of the respective first device and second device can also be included in the connected graph, with respect to, and in association with, the respective graph nodes representing the first device and second device.

FIG. 7 illustrates a method 700 for the generation of behavior profiling reports for each device that is included in a wired and/or wireless network or wired and/or wireless collection of devices, as well as for the generation and association of severity scores to each generated behavior profiling report for each respective device included the networked collection of devices. Method 700 can commence at 702, where system 100 can receive existing network traffic data such as, network log files that can include data maintained, for example, by devices comprising firewall devices, proxy server devices, intrusion detection system devices, intrusion protection system devices, authentication server devices, web server devices, database devices, and the like.

At 704, system 100, for each device included in the existing network traffic data, can identify, with respect to each devices included in the existing network traffic data, behavior features (both normal and/or anomalous) captured within a defined moving time window. This time window can be variable in nature. For instance, in one embodiment, the defined moving time window can encapsulate a timeframe of two days. In another example embodiment, the defined moving time window can encapsulate a timeframe of five days. In an additional example embodiment, the defined moving time window can be a time frame of seven days.

At 706, in response to, based on, and/or as a function of the identified behavior features, system 100 can determine whether there exists unknown destination addresses to which a first device had communication with a second device, within the time frame defined by the moving time window. At 708, in response to the number (e.g., a value) of unknown destination addresses with which the first device had communication having exceeded a threshold value, system 100 can generate a new day report that includes the unknown destination addresses.

FIG. 8 depicts an example forensic report 800 that can be generated by system 100 in accordance with various embodiment disclosed herein. As illustrated, forensic report 800 can include mapped, interrelated, or correlated data representative historical security event data and owner data. As has been noted, historical security event data can have been obtained, or received, from one or more network devices, for example, firewall devices, proxy server devices, intrusion detection system devices, intrusion protection system devices, web server/service devices, authentication server devices, and the like. Further, owner data, as has also be noted, can comprise records that provide details, such as, based on or as function of an IP address of a device, the domain information for the device, the organization name associated with the device, the organization mailing address associated with the device, the contact information associated with the device, records regarding the date the entry was created for the device, and if and when, the owner record was changed, the date that any change was effectuated and/or became effective.

As depicted the forensic report 800 notes the date 802 for which the report was generated (e.g., 2015 Feb. 6), the number of connections 804 that were observed for the particular date; and the number of new connections 806. In this instance, there were 56 connections observed on the day, of which 18 when new connections. Also illustrated in the report 800 is information related to the historical maximum number of connections to a port (e.g., port 80) 808 that are typically open (e.g., 4), and the number of connections to a port (port 80) that were open 810 for the day at issue (e.g., 50). Also illustrates are connections to a port (e.g., 443) that has not be accessed before 812. Additionally, as illustrated in forensic report 800 is a weighted sum 814 of all the positive changes that have been identified in the report (e.g., 226). This weighted sum 814 can be used, by system 100, to rank the generated reports thereby helping analysts to focus on, and prioritize, reports that comprise the most suspicious activity without having to review all reports that are generated.

FIG. 9 illustrates a further example report 900 that can be generated by system 100 in accordance with one or more disclosed embodiments. The generated report 900 can include records from received or obtained historical security event data mapped, correlated, interlinked with obtained or received owner data. Historical security event data can have been obtained or received from one or more network devices, for instance, firewall devices, proxy server devices, intrusion detection system devices, intrusion protection system devices, web server/service devices, authentication server devices, etc. Owner data can comprise records that provide details, such as, based on or as a function of an IP address (e.g., identified in the historical security event data) of a device, the domain information for the device, the organization name associated with the device, the organiza-
tion mailing device associated with the organization name, the contact information associated with the organization name, records regarding the date the entry was created for the organization and the particular device, and if, and when, the owner record was changed, the date that any change was effectuated and/or became effective.

As illustrated, example report 900 notes the date 902 for which the report was generated (e.g. 2015 Jul. 6), the change in behavior in relation to the previous 7 days 904, the total number of connections for the date: 2015 Jul. 6, 906, and the number of new connections for the date 2015 Jul. 6 with respect to the previous 7 days, 908. Additional detail that can be included in example report 900 can include suspicious defective IP addresses associated with specific devices and organizations (e.g., "Dubious, Inc." and "Shady Network Inc.") 910A and 910B. It will be appreciated that the respective organization names: "Dubious, Inc." and "Shady Network Inc." can be information that can have been obtained from owner information, and the respective IP addresses: "237.245.221.10" and "34.56.72.25" can be information that can have been obtained from historical security event data. As will also be appreciated, the data related to the respective IP addresses from the historical security event data can have been correlated with the respective ownership information obtained from owner data.

Additional data that can also be included in example report 900 can include information regarding percentage values associated with the number of connections to a report with respect to the maximum detected number of connections within the previous 7 days [912]. In this instance, there has been a 75,719,650% increase in port 80 connections with respect to the maximum number of connections detected in the previous 7 days. Additionally, there were 34 new connections to port 3307 when there were no connections to port 3307 within the previous 7 days [914]. Further, as indicated, there was a 93% increase in daily connections to port 139 in relation to the maximum number of detected connections to port 139 within the previous 7 days [916]. Also included in example report 900 is a notation that there has been a 4137% increase in daily firewall actions in relation to the maximum recorded within the previous 7 days [918].

Figure 10:
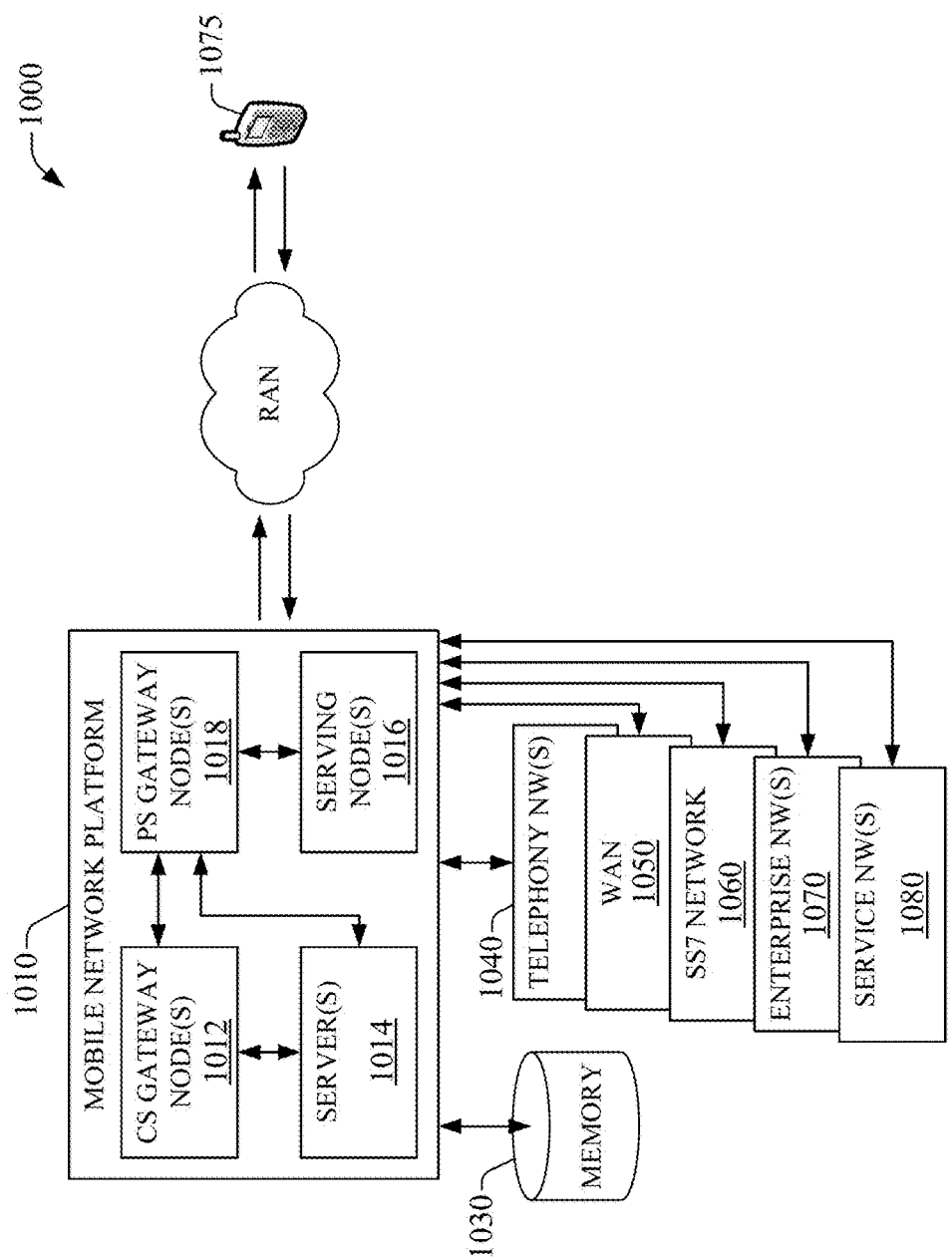
FIG. 10 is a block diagram of an example embodiment of a mobile network platform to implement and exploit various features or aspects of the subject disclosure.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

Figure 11:
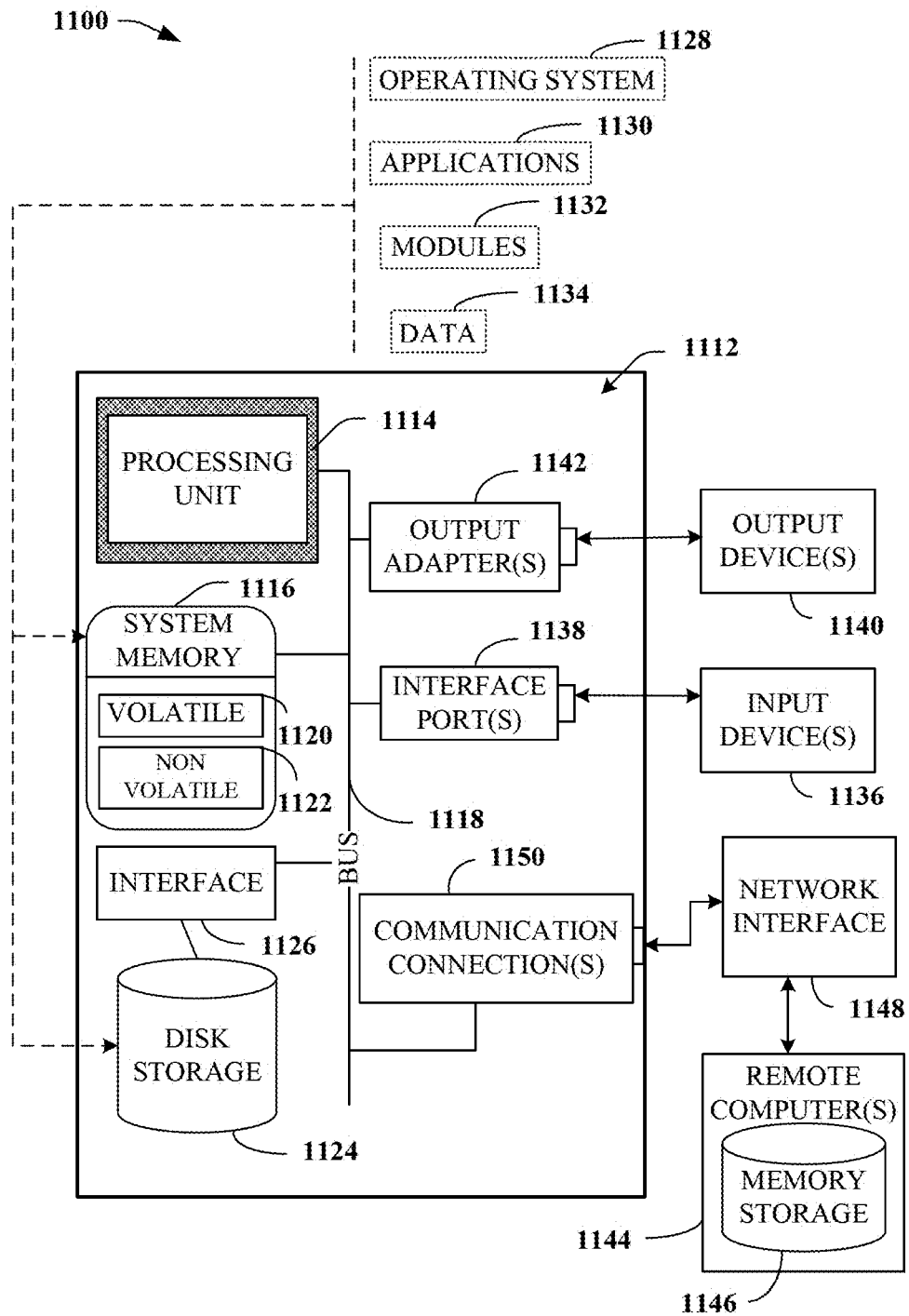
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, ... ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 110, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
 a processor; and
 a memory that stores executable instructions that, when executed by the processor, facilitate performance of operations, comprising:
  receiving historical security event data representing historical security events of a first device and owner data representing an owner of the first device;
  as a function of the historical security event data and the owner data, identifying an existence of an anomalous contact established between the first device and a second device;
  generating a severity score for the second device based on a weighted sum value determined as a function of the anomalous contact aggregated in a group of anomalous contacts that have occurred between the first device and the second device within a defined period of time, and as a function of a value representing a number of connections attempted by the second device to a port associated with the first device, wherein the port that has not been accessed prior to the defined period of time; and in response to identifying the existence of the anomalous contact and based on the severity score, depicting the second device on a connected graph of anomalous contacts established by the first device.

2. The device of claim 1, wherein the defined period of time is a first defined period of time, and wherein the operations further comprise determining the existence of the anomalous contact as a function of the first device being determined to have failed to establish a contact with the second device within a second defined period of time.

3. The device of claim 1, wherein the operations further comprise connecting the first device and the second device as depicted on the connected graph of the anomalous contacts with an edge representing a connection between the first device and the second device.

4. The device of claim 1, wherein the first device and the second device are part of a geographically distributed network of devices.

5. The device of claim 1, wherein the owner data is received from a database device maintained by a regional Internet registry device.

6. The device of claim 1, wherein the operations further comprise using a white-list of devices that are accorded a defined privilege, a defined service, a defined mobility, a defined access, or a defined recognition.

7. The device of claim 1, wherein the defined period of time is a first defined period of time, and wherein the anomalous contact is a communication by the first device to the second device within a third defined period of time.

8. The device of claim 1, wherein the defined period of time is a first defined period of time, and wherein the anomalous contact is a communication by the second device to the first device within a fourth defined period of time.

9. The device of claim 1, wherein the historical security event data and the owner data is correlated as a function of an internet protocol address.

10. A method, comprising:
as a function of historical security event data and owner data, determining, by a system comprising a processor, an existence of an anomalous contact established between a first device and a second device;
generating, by the system, a severity score for the second device based on a weighted average value determined as a function of the anomalous contact aggregated in a grouping of anomalous contacts that have occurred between the first device and the second device within a determined period of time, and as a function of a value representing a number of connections by the second device using a port associated with the first device, wherein the port has not been accessed prior to the determined period of time; and
in response to identifying the existence of the anomalous contact and as a function of the severity score, depicting, by the system, the second device on a connected graph of anomalous contacts established by the first device.

11. The method of claim 10, further comprising receiving, by the system, the historical security event data representing the historical security events of the first device and the owner data representing an identity associated with an owner of the first device.

12. The method of claim 10, further comprising determining, by the system, the existence of the anomalous contact as a function of the first device being determined to have failed to establish a contact with the second device within a defined period of time.

13. The method of claim 10, further comprising connecting, by the system, the first device and the second device as depicted on the connected graph of the anomalous contacts with an edge representing a connection between the first device and the second device.

14. The method of claim 10, wherein the first device and the second device form part of a geographically distributed network of devices.

15. The method of claim 10, further comprising receiving, by the system, the owner data from a database device populated by the first device.

16. The method of claim 10, further comprising using, by the system, a list of devices that are accorded a defined privilege, a defined service, a defined mobility, a defined access, or a defined recognition.

17. The method of claim 10, wherein the anomalous contact is a communication by the first device to the second device within a defined time period.

18. The method of claim 10, wherein the anomalous contact is a communication by the second device to the first device within a defined period of time.

19. A non-transitory machine-readable storage medium, comprising executable instructions that, when executed by a processor, facilitate performance of operations, comprising:
receiving security event data representing security events associated with a first device and owner data representing an owner identity associated with the first device;
as a function of the security event data and the owner data, determining an existence of an anomalous contact established between the first device and a second device;
generating a severity score for the second device based on a weighted sum value determined as a function of the anomalous contact aggregated into a collection of anomalous contacts that have occurred between the first device and the second device within a determined period of time, and based on a value representing a number of attempted connections by the second device to a port associated with the first device, wherein the port has not been accessed prior to the determined period of time; and
in response to determining the existence of the anomalous contact, depicting the second device on a graph of anomalous contacts established by the first device.

20. The non-transitory machine-readable storage medium of claim 19, wherein the operations further comprise determining the existence of the anomalous contact as a function of the first device being determined to have failed to establish a contact with the second device within a defined time period.

* * * * *